United States Patent [19]
Colon

[11] Patent Number: 5,869,152
[45] Date of Patent: Feb. 9, 1999

[54] SILICA MATERIALS

[75] Inventor: Luis A. Colon, Amherst, N.Y.

[73] Assignee: The Research Foundation of State University of New York, Amherst, N.Y.

[21] Appl. No.: 609,425

[22] Filed: Mar. 1, 1996

[51] Int. Cl.⁶ .................................................. B32B 9/00
[52] U.S. Cl. ................... 428/34.4; 428/36.91; 428/402; 428/406; 428/428; 501/12; 501/33; 210/506; 210/510.1
[58] Field of Search ............................. 428/34.4, 36.91, 428/402, 404, 406, 428; 210/198.2, 502.1, 506, 510.1; 65/17.2; 501/12, 33

[56] References Cited

U.S. PATENT DOCUMENTS

| | | | |
|---|---|---|---|
| 4,540,486 | 9/1985 | Ramsden | 210/198.2 |
| 4,551,245 | 11/1985 | Ramsden et al. | 210/198.2 |
| 4,731,264 | 3/1988 | Lin et al. | 427/387 |
| 4,753,827 | 6/1988 | Yoldas et al. | 427/387 |
| 4,754,012 | 6/1988 | Yoldas et al. | 528/10 |
| 4,835,269 | 5/1989 | Kahovec et al. | 544/69 |
| 5,032,266 | 7/1991 | Kirkland et al. | 210/198.2 |
| 5,036,145 | 7/1991 | Echterling et al. | 525/431 |
| 5,709,715 | 1/1998 | Guidotti | 8/115.51 |

OTHER PUBLICATIONS

Schmidt et al., "Principles of Hydrolysis and Condensation Reaction of Alkoxysilanes," *J. Non–Crystalline Solids,* 63:1–11 (1984).

Schmidt, "New Type of Non–Crystalline Solids Between Inorganic and Organic Materials," *J. Non–Crystalline Solids,* 73:681–689 (1985).

Sandoval et al., "Synthesis and Characterization of a Hydride–Modified Porous Silica Material as an Intermediate in the Preparation of Chemically Bonded Chromatographic Stationary Phases," *Anal. Chem.,* 61:2067–2075 (1989).

Cobb et al., "Electrophoretic Separations of Proteins in Capillaries with Hydrolytically Stable Surface Structures," *Anal. Chem.,* 62:2478–2483 (1990).

Coltrain et al., "The Chemistry of Hydrolysis and Condensation of Silica Sol–Gel Precursors, " In Berga, Ed., *The Colloid Chemistry of Silica,* Washington D.C.:American Chemical Society, pp. 403–418 (1994).

Schmidt et al., "Chemistry and Properties of Porous Organically Modified Silica," In Berga, Ed., *The Colloid Chemistry of Silica,* Washington D.C.:American Chemical Society, pp. 419–422 (1994).

Colon et al., "Novel Coating Materials for Open Tubular Electrochromatography," Paper No. P–117, *Sixth International Symposium on High Performance Capillary Electrophoresis, Sandiego, Ca (Feb. 1994).*

Colon et al., "Modification of the Inner Capillary Surface by the Sol–Gel Method: Application to Electrically and /or Pressure Driven Open Tubular Liquid Chromatography," *Proceedings of the 17th International Symposium on Capillary Chromatography and Electrophoresis, Wintergreen, Virginia, May 7–11, 1995*(1995).

(List continued on next page.)

*Primary Examiner*—Timothy M. Speer
*Attorney, Agent, or Firm*—Nixon, Hargrave, Devans & Doyle LLP

[57] ABSTRACT

The present invention relates to silica materials and particles having surfaces which define an interior. The interior includes interior silicon atoms at least a portion of which is bonded to a substituted or unsubstituted alkyl moiety. In a preferred aspect of the present invention, the silica material also has surface silicon atoms to which are bonded substituted or unsubstituted alkyl moieties. A capillary tube coated on its inner surface with the silica material of the present invention is also disclosed. The silica materials of the present invention are resistant to degradation at high or low pH and are particularly useful as chromatographic stationary phases, especially for use in open tubular liquid chromatography and open tubular electrochromatography.

26 Claims, 9 Drawing Sheets

OTHER PUBLICATIONS

Guo et al., "A Stationary Phase for Open Tubular Liquid Chromatography and Electrochromatography using Sol–Gel Technology," *Analytical Chemistry,* 67:2511–2516 (1995).

Guo et al., "Modification of the Inner Capillary Surface by the Sol–Gel Method: Application to Open Tubular Electrochromatography," *J. Microcolumn Separations,* 75:485–491 (1995).

Guo et al., *Book of Abstracts Presented at Pittcon '95, Mar. 5–10, 1995,* Abstract No. 961 (1995).

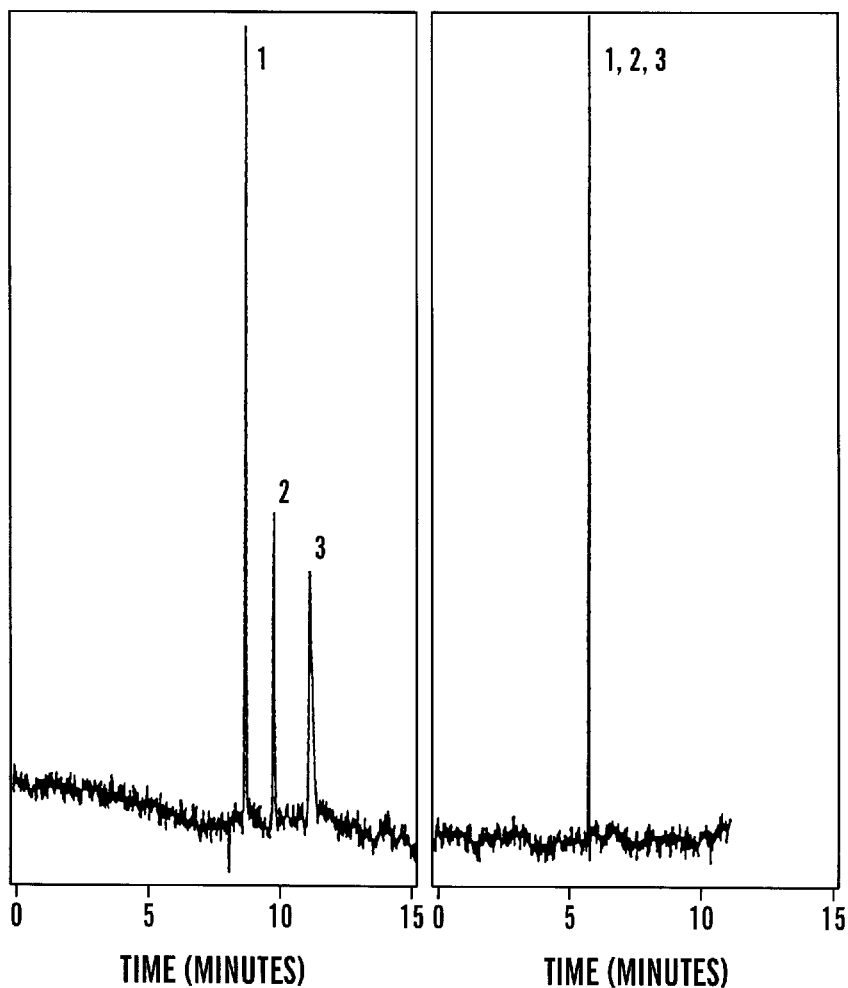
*FIG. 3A*  *FIG. 3B*

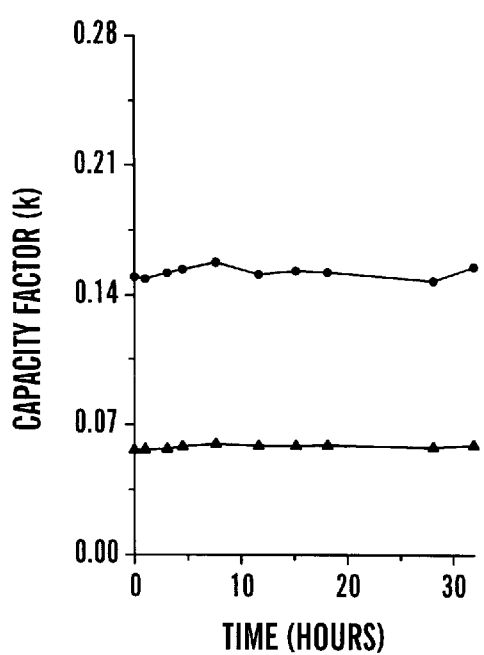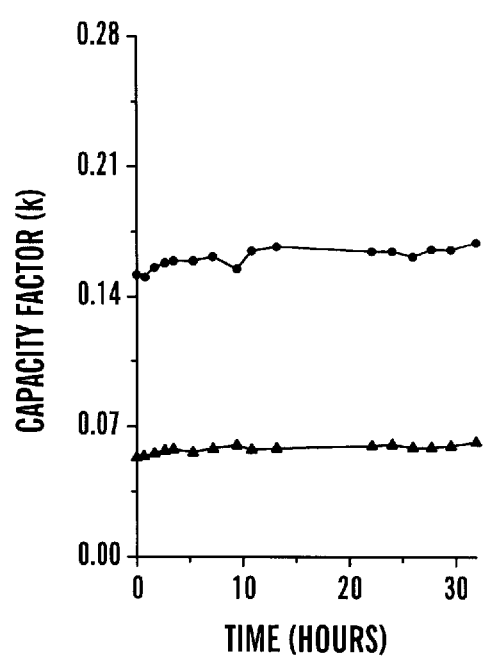
*FIG. 7A*  *FIG. 7B*

SILICA MATERIALS

The invention was made with support from the National Science Foundation (Grant No. 9411693). The Federal Government may retain certain rights in the invention.

FIELD OF INVENTION

The present invention relates, generally, to a silica materials and, particularly, to silica materials with stable bonded phases.

BACKGROUND OF THE INVENTION

Chromatographic separation techniques are widely employed in the analysis of chemical components in complex samples. Because of their mechanical and chemical characteristics and because of their relatively low cost, silica surfaces are widely used to carry stationary phases in chromatographic processes. Most of the chromatographic stationary phases in use today are based on chemical modification of silica surfaces (Unger, ed., *Packings and Stationary Phases in Chromatographic Techniques,* New York-:Marcel Dekker (1990) ("Unger")). Organic molecules with specific properties are chemically bonded to the silica surface to produce chromatographic stationary phases with desired functionality. This approach is based on the reaction of organosilanes with the silanol groups at the surface of the silica materials. However, these preparative methods require the use of highly reactive and corrosive silanization agents, which, in view of environmental concerns, are becoming increasingly impractical for the individual practitioner. The reactions are also very time consuming and need to be conducted in a controlled, inert environment, typically in a glove box or other such device. Furthermore, stationary phases formed with silanizing agents are chemically unstable, especially at high or low pH, which results in shortened life of the stationary phase and poor chromatographic separation.

In particular, open tubular liquid chromatography ("OTLC") and open tubular electrochromatography ("OTEC") have shown a great potential to reach high efficiencies for the analysis of complex sample mixtures (Dorsey et al., *Anal. Chem.,* 66:531R (1994) ("Dorsey"), Ishii et al., *J. Chromatogr. Sci.,* 18:462 (1980) ("Ishii"), and Kennedy et al., *Science* 246:57 (1989) ("Kennedy")). Preparation of the stationary phase is of key importance to achieve the high performance offered by these techniques.

However, capillary columns, especially capillary columns having less than about a 15 $\mu$m inside diameter, coated with an appropriate stationary phase and having sufficient retentive and mass loadability characteristics, have been particularly difficult to prepare. This is one of the reasons why OTLC, for example, is presently being used in only a few research laboratories (Bruin et al. *J. Chromatogr.,* 517:557 (1990)) despite its many advantages (Dorsey, Ishii, and Kennedy) over the more conventional high-performance liquid chromatography ("HPLC").

Although in the past 15 years efforts have been made to prepare stationary phases for capillary columns (Tsuda et al., *J. Chromatogr.,* 11:332 (1978) ("Tsuda"), Jorgenson et al., *J. Chromatogr.,* 255:335 (1988) ("Jorgenson"), Tock et al., *J. Chromatogr.,* 477:95 (1989), Crego et al., *Anal. Chem.,* 65:1615 (1993) ("Crego"), Dluzneski et al., *J. High Resolut. Chromatogr. Chromatogr. Commun.* 11:332 (1985) ("Dluzneski"), Folestad et al., *J. Chromatogr.,* 391:347 (1987) ("Folestad"), and Bohlin et al., *J. Chromatogr.,* 645:41 (1993) ("Bohlin")), there are still several problems associated with the methods developed so far.

Stationary phases that are chemically bonded directly to the inner wall of capillary columns offer very low phase ratios, which lead to low retention and low sample capacity (Tsuda and Jorgenson).

Methods developed to increase surface area and phase ratio involve two major steps: (1) laying down a porous silica layer and (2) attaching functional groups onto the prepared layer through chemical bonding (Tock et al., *J. Chromatogr.,* 477:95 (1989) and Crego). Aside from the fact that these procedures are time consuming and require the manipulation of highly reactive and corrosive silanizing agents, the procedures are unreliable, frequently producing a significant number of columns which are unsuitable for use. For example, Crego reports success rates of less than 80%. Furthermore, the functional groups serving as the stationary phase are attached to the inner wall of the capillary columns (with or without the porous layer) through surface —O—Si—C bonds. These bonds are unstable at pH extremes, and this instability limits the pH range at which the columns can be operated.

Other methods for increasing surface area and phase ratio of capillary columns have employed polymeric stationary phases, such as cross-linked polysiloxanes, described in Dluzneski, Folestad, and Bohlin, and polyacrylates, disclosed in Ruan et al., *Chromatographia,* 35:597 (1993) and Swart et al., *J. Chromatogr.,* 670:25 (1994). Although these stationary phases usually give good column stability, high phase ratio, and sufficient retention, they exhibit poor column efficiency, due to the slow diffusivity of solutes in the retentive layers.

The present invention is directed to overcoming these deficiencies in the art.

SUMMARY OF THE INVENTION

The present invention relates to a continuous mass of silica material having surfaces which define an interior. The interior includes interior silicon atoms at least a portion of which is bonded to a substituted or unsubstituted alkyl moiety having from 6 to 32 carbon atoms.

The present invention also relates to a glass particle. The glass particle has a diameter of from about 0.3 $\mu$m to about 500 $\mu$m and a surface which defines an interior. The interior of the glass particle includes interior silicon atoms, at least a portion of which is bonded to a substituted or unsubstituted alkyl moiety.

Another aspect of the present invention relates to a composite glass article which includes a glass tube and a continuous mass of silica material. The glass tube has an inner wall which defines an inner cylindrical space. The continuous mass of silica material is covalently bonded to the inner wall of the glass tube and has a surface which defines an interior. The interior of the continuous mass of silica includes interior silicon atoms, at least a portion of which is bonded to a substituted or unsubstituted alkyl moiety.

The present invention is also directed to a method for preparing a glass material. A glass forming mixture is formed. The mixture includes a solution of one or more alkylalkoxysilanes having the formula:

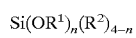

where n is 2 or 3 and where $R^1$ and $R^2$ are the same or different and are substituted or unsubstituted alkyl groups having from 6 to 32 carbon atoms in a solvent. The one or more alkylalkoxysilanes in the glass forming mixture is converted to a network of corresponding one or more silicon oxides. A gel is then formed from the glass forming mixture containing the network of corresponding one or more silicon oxides. The gel is then dried to form a porous glass.

The present invention is also directed to a method for preparing a composite glass capillary tube. A glass forming mixture is provided. The mixture includes a solution of one or more alkylalkoxysilanes having the formula:

$$Si(OR^1)_n(R^2)_{4-n}$$

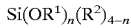

where n is 2 or 3 and where $R^1$ and $R^2$ are the same or different and are substituted or unsubstituted alkyl moieties in a solvent. The glass forming mixture is then contacted with the inner surface of the glass capillary tube for a period of time effective to react a portion of the glass forming mixture with the inner surface of the glass capillary tube. The one or more alkylalkoxysilanes in the glass forming mixture is then converted to a network of corresponding one or more silicon oxides. A gel is formed from the glass forming mixture containing the network of corresponding one or more silicon oxides, and the gel is dried to form a porous glass coating on the capillary tube's inner surface. In this manner a composite glass capillary tube having an inner surface functionalized with a covalently bonded substituted or unsubstituted alkyl moiety is produced.

The silica materials of the present invention are resistant to degradation at high or low pH and are particularly useful as chromatographic stationary phases, especially for use in OTLC and OTEC. The methods of the present invention combine the synthesis of a bonded phase and a supporting porous glass matrix in a single step. This approach increases the column surface area leading to a higher phase ratio and, in addition, reduces the overall column preparation time. Moreover, using this sol-gel procedure, it is possible to prepare columns with mixed phases which can be tuned to attain a desired chromatographic selectivity.

BRIEF DESCRIPTION OF THE DRAWINGS

FIGS. 3A and 3B are chromatograms depicting the separation of a test mixture containing three PAH compounds ((1) naphthalene, (2) phenanthrene, and (3) pyrene) by OTEC in two different capillaries: a capillary coated with a $C_8$-TEOS/TEOS ratio of 0.2 (FIG. 3A) and a capillary coated with TEOS only (FIG. 3B). Separation conditions were as follows: capillary column, 13 μm i.d.×50 cm (injection to detection); mobile phase, methanol/1 mM phosphate (67:33); separation voltage, 30 kV; electrokinetic injection, 1 s at 30 kV; detection, UV at 220 nm.

In FIG. 4A, resolution ("R") and the selectivity factor ("α") were $R_{2,3}$=2.3, $R_{4,5}$=1.2, $α_{2,3}$=1.40, and $α_{4,5}$=1.14; the capacity factor ("k") and number of theoretical plates ("N") were as follows: naphthalene, k=0.047, N=285,000/m; biphenyl, k=0.076, N=240,000/m; fluorene, k=0.106, N=211,000/m; 2-ethylnaphthalene, k=0.144, N=204,000/m; and 2,6-dimethylnaphthalene, k=0.144, N=204,000/m. In FIG. 4B, resolution ("R") and the selectivity factor ("α") were $R_{2,3}$=0.7, $R_{4,5}$=0, $α_{2,3}$=1.34, and $α_{4,5}$=1.00; the capacity factor ("k") and number of theoretical plates ("N") were as follows: naphthalene, k=0.026, N=231,000/m; biphenyl, k=0.044; fluorene, k=0.059; 2-ethylnaphthalene, k=0.080; and 2,6-dimethylnaphthalene, k=0.080.

In FIG. 5A, resolution ("R") and the selectivity factor ("α") were $R_{2,3}$=3.2, $R_{4,5}$=1.5, $α_{2,3}$=1.35, and $α_{4,5}$= 1.11; the capacity factor ("k") and number of theoretical plates ("N") were as follows: naphthalene, k=0.069, N=280,000/m; biphenyl, k=0.104, N=500,000/m; fluorene, K=0.140, N=310,000/m; 2-ethylnaphthalene, k=0.162, N=353,000/m; and 2,6-dimethylnaphthalene, k=0.179, N=382,000/m. In FIG. 5B, resolution ("R") and selectivity facor ("α") were $R_{2,3}$=0.4, $R_{4,5}$=0, $α_{2,3}$=1.23, and $α_{4,5}$=1.00; the capacity factors ("k") were as follows: naphthalene, k=0.014; biphenyl, k=0.031; fluorene, k=0.038; 2-ethylnaphthalene, k=0.038; and 2,6-dimethylnaphthalene, k=0.038.

FIGS. 7A and 7B are graphs showing the retentive characteristics of capillary columns prepared by the sol-gel method after being exposed to acidic conditions (FIG. 7A) and basic conditions (FIG. 7B) for naphthalene (▼) and phenanthrene (●).

DETAILED DESCRIPTION OF THE INVENTION

Figure 1:
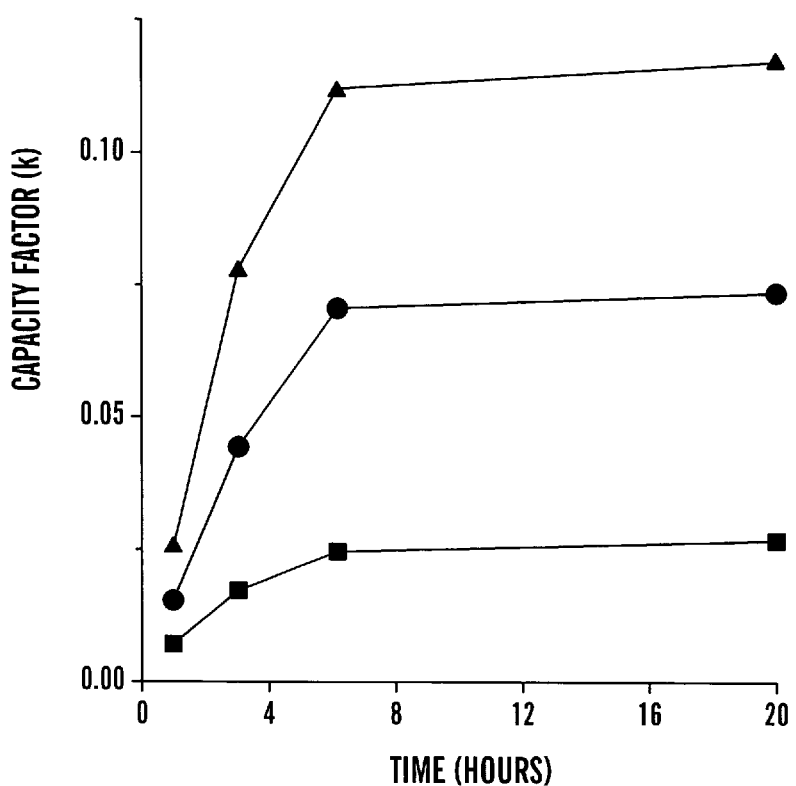
FIG. 1 is a graph showing the effect of reaction time on capacity factors for three model compounds (naphthalene (■), phenanthrene (●), and pyrene (▼) separated by OTEC. The original sol-gel solution contained a n-octyltriethoxysilane ("$C_8$-TEOS") to tetraethoxysilane ("TEOS") ratio of 0.3. Separation conditions were as follows: fused silica capillary, 13 μm i.d.×50 cm long (injection to detection); mobile phase, methanol/1 mM phosphate (67:33); separation voltage, 30 kV; electrokinetic injection, 1 s at 30 kV; detection, UV at 220 nm.

The present invention relates to a silica material. The silica material has surfaces which define an interior. The interior includes interior silicon atoms at least a portion of which is bonded to an alkyl moiety.

Silica material, as used herein, means a continuous mass of silica. The interior of the continuous mass of silica material is generally thought of as a three-dimensional network of silicon and oxygen atoms into which molecules (such as gaseous silanizing agent molecules or molecules of a solution containing a silanizing agent) cannot penetrate from non-interior spaces. The complexity of the continuous silica mass can be simple, i.e. having a single topological surface, as in the case of a sphere, a cube, a torus, a multi-hole torus, a cylinder, a cylindrical shell, and the like, or it can be complex, i.e. having two or more topological surfaces, as in the case of a spherical shell or a dumbbell, each lobe of which is hollow.

The surface of the silica material can also comprise surface silicon atoms, a portion of which can also be bonded to an alkyl moiety. Generally, the fraction of interior silicon atoms bonded to alkyl moieties and the fraction of surface silicon atoms bonded to alkyl moieties will be the same. Consequently, in cases where the surface properties of the silica material are important, such as in chromatographic applications, the fraction of interior silicon atoms which are bonded to an alkyl moiety will depend on the desired fraction of surface silicon atoms bonded to the alkyl moiety, which, in turn, will depend on the particular chromatographic application to which the material is to be put. In addition, suitable fractions of interior silicon atoms bonded to the alkyl moiety are constrained by the required mechanical strength of the material. Generally, the greater the fraction of interior silicon atoms that are bonded to alkyl moieties, the lower the material's mechanical strength. For many applications, including chromatographic applications, suitable silica materials include those in which about 1% to about 100% of the interior silicon atoms and about 1% to about 100% of the surface silicon atoms are bonded to the alkyl moiety.

The alkyl moiety can be substituted or unsubstituted and can contain any number of carbon atoms, typically from 6 to 32 carbon atoms. Unsubstituted alkyl moieties are those which comprise only hydrogen and carbon. They can be linear alkyl groups having the formula $(CH_2)_m CH_3$, where m is an integer, typically from about 5 to about 31, such as methyl, ethyl, n-propyl, n-butyl, n-hexyl, n-heptyl, n-octyl, n-nonyl, n-decyl, n-undecyl, n-dodecyl, n-cosadecyl, and n-docosadecyl. One preferred linear unsubstituted alkyl group is the n-octyl group, in which case m, in the above formula, is 7. Alternatively, the unsubstituted alkyl can be a branched alkyl, such as isopropyl, sec-butyl, tert-butyl, neopentyl, 2-methylbutyl, 3-methylbutyl, 2-methylpentyl, 3-methylpentyl, 4-methylpentyl, 2,2-dimethylpentyl, 2,3-dimethylpentyl, and 3,3-dimethylpentyl.

Substituted alkyls are alkyl moieties, examples of which include those indicated above, in which one or more of the hydrogens are replaced with a non-alkyl moiety. Suitable non-alkyl moieties include aryl groups, such as phenyl, tolyl, and naphthyl, and functionalized aryl groups, such as 4-hydroxyphenyl, 3-chloro-4-hydroxyphenyl, 4-carboxyphenyl, and 3-carboxy-3-tolyl. Suitable non-alkyl moieties also include functional groups, such as alcohols, amines, carboxylic acids, carboxylic acid esters, carboxylic acid amides, sulfonic acids, thiols, and halides. The particular substituent selected depends on the application for which the silica material is to be used. In chromatographic applications, suitable functional groups for particular separations are well known in the art and are summarized in Unger, which is hereby incorporated by reference.

The continuous mass of silica material of the present invention can have any suitable shape. For example, the material can be a free-standing, three-dimensional monolith, such as a bead, a rod, or a fiber. Such free-standing materials also include particles having diameters of from about 0.3 μm to about 500 μm. The particles can be spherical, substantially spherical, or of any other suitable shape, such as cylindrical, tubular, planar, cubical, hexahedral, octahedral, ellipsoidal, and the like. Where the particle's shape is other than spherical, diameter refers to the diameter of the smallest possible circumscribed sphere.

Alternatively, the continuous mass of silica material can be a film. Films can be free-standing, or they can be bonded to a substrate.

Where the film is bonded to a substrate, the film can be of any thickness suitable for the application in which the silica material is to be employed. In certain applications where the characteristics of the film's surface is important, such as in chromatographic applications, and where the surface of the film is subject to wear, such as in cases where the film is exposed to pH extremes, the film should be sufficiently thick to provide a long-lasting film surface. Suitable film thicknesses are from about 1 nm to about 100 mm.

Although the substrate can be any material on which silica can be deposited by conventional sol-gel processes, including polymeric materials, such as polyethylene, polytetrafluoroethylene, and polyhexafluoropropyl-co-tetrafluoroethylene, and metallic surfaces, such as stainless steel, aluminum, platinum, copper, and gold, the substrate, for many applications, is most conveniently a glass having surface siloxy groups to which the silica material of the present invention is covalently bonded. Suitable glasses include borosilicate glasses, fused silica glasses, and quartz. Illustrative glass substrates include glass particles, glass fibers, glass beads, glass rods, glass tubes, and glass plates.

One substrate, particularly useful in chromatographic applications, is a glass tube, particularly a fused silica glass capillary tube. The glass tube has an inner surface (referred to herein also as an inner wall) which defines an inner cylindrical space. The continuous mass of silica material can either be a film covalently bonded to the inner wall of the glass tube, thus forming a composite glass tube having an inner diameter reduced by twice the film thickness, or the continuous mass of silica (or a plurality of continuous masses of silica) can fill the inner cylindrical space defined by the inner surface of the glass tube. In the latter case, where the tube is to be used for chromatographic applications, it is preferred that the silica material be permeable to the mobile phase used in the chromatographic application. Generally, this is achieved when the silica material is an aerogel.

The present invention also relates to a method for preparing a glass material. A glass forming mixture is formed. The mixture includes a solution of one or more alkylalkoxysilanes having the formula:

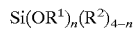

in a suitable solvent. The one or more alkylalkoxysilanes in the glass forming mixture are converted to a network of corresponding one or more silicon oxides. A gel is then formed from the glass forming mixture containing the network of corresponding one or more silicon oxides. Drying the gel produces a porous glass.

The alkylalkoxysilanes can be dialkyldialkoxysilanes (in which case n, in the above formula, is 2), alkyltrialkoxysilanes (in which case n, in the above formula, is 3), or combinations of these. For example, the one or more alkylalkoxysilanes can be a single dialkyldialkoxysilane, a single alkyltrialkoxysilane, a plurality of dialkyldialkoxysilanes (each having different $R^1$, $R^2$, or both) a plurality alkyltrialkoxysilanes (each having different $R^1$, $R^2$, or both), or one or more dialkyldialkoxysilanes in combination with one or more alkyltrialkoxysilanes.

$R^1$ and $R^2$ in the above formula are the same or different and are substituted or unsubstituted alkyl groups. $R^1$ is preferably a short chain unsubstituted linear alkyl, such as methyl or ethyl. $R^2$ can be substituted or unsubstituted and can contain any suitable number of carbon atoms, typically from 6 to 32 carbon atoms. Unsubstituted alkyl moieties are those which comprise only hydrogen and carbon. They can be linear alkyl groups having the formula $(CH_2)_mCH_3$, where m is an integer, typically from about 5 to about 31, such as methyl, ethyl, n-propyl, n-butyl, n-hexyl, n-heptyl, n-octyl, n-nonyl, n-decyl, n-undecyl, n-dodecyl, n-cosadecyl, n-docosadecyl. Alternatively, the unsubstituted alkyl can be a branched alkyl, such as isopropyl, sec-butyl, tert-butyl, neopentyl, 2-methylbutyl, 3-methylbutyl, 2-methylpentyl, 3-methylpentyl, 4-methylpentyl, 2,2-dimethylpentyl, 2,3-dimethylpentyl, and 3,3-dimethylpentyl.

Substituted alkyls are alkyl moieties, such as those listed above, having one or more of their hydrogens replaced with a non-alkyl moiety. Suitable non-alkyl moieties include aryl groups, such as phenyl, tolyl, and naphthyl and functionalized aryl groups, such as 4-hydroxyphenyl, 3-chloro-4-hydroxyphenyl, 4-carboxyphenyl, and 3-carboxy-3-tolyl. Suitable non-alkyl moieties also include functional groups, such as alcohols, amines, carboxylic acids, carboxylic acid esters, carboxylic acid amides, sulfonic acids, thiols, and halides. The particular substituent selected depends on the use to which the material is to be put. For example, where the silica material is to be used in a chromatographic application, suitable functional groups for effecting particular separations are described in standard chromatography reference books, such as Unger, Poole et al., *Chromatography Today,* New York:Elsevier (1991), and Heftmann, ed., *Chromatography,* 5th ed., New York:Elsevier (1992), which are hereby incorporated by reference.

The glass forming mixture may optionally further include one or more tetraalkoxysilanes having the formula:

Si(OR³)₄ where $R^3$ is H or unsubstituted alkyl, such as methyl or ethyl. The molar ratio of tetraalkoxysilanes and alkylalkoxysilanes is selected based on the desired physical bulk properties (such as density and mechanical strength) and surface characteristics of the resulting glass material. Generally, glass materials made from glass forming mixtures having higher tetraalkoxysilane to alkylalkoxysilane molar ratios are denser, stronger, and more stable but, when used in chromatographic applications, exhibit lower phase ratios and column efficiencies. Glass materials of the present invention made from glass forming mixtures containing tetraalkoxysilanes and alkylalkoxysilanes in molar ratios of from about 0.01 to about 50, preferably from about 0.01 to about 6, are suitable for many applications, including many chromatographic applications.

The glass forming mixture can also contain alkoxides of other metals, such as Al, Zr, and Ti, whose oxide form is desired in the final glass product. The molar ratio of alkoxides of other metals to alkylalkoxysilanes and tetraalkoxysilanes (taken together) can be from zero to about 1, preferably, from zero to about 0.15, and, most preferably, zero.

The method of the present invention is carried out using a conventional sol gel procedure. This involves forming a glass forming mixture (commonly referred to as a "sol") of the alkylalkoxysilane(s), optional tetraalkoxysilane(s), and alkoxides of other metals in a suitable solvent. Solvents useful in the practice of the present invention include alcohols, such as methanol, ethanol, propanol, i-propanol, butanol, i-butanol, t-butanol, mixtures of alcohols, or combinations of alcohols and other water-miscible solvents. The solvent also contains water in an amount sufficient to effect hydrolysis, preferably in a stoichiometric amount. The pH of the solvent is adjusted so that it is effective to hydrolyze the alkylalkoxysilanes and the optional tetraalkoxysilane(s) and metal alkoxides employed.

The alkylalkoxysilane(s) and the optional tetraalkoxysilane(s) and metal alkoxides in the glass forming mixture are then converted, preferably with agitation, to a network of corresponding silicon oxides. It is believed that the network forms as a result of agitation and both water and alcohol condensation. Possible reactions include the following:

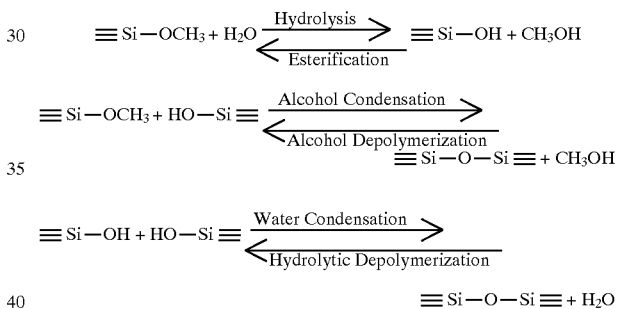

A gel is then formed from the glass forming mixture containing the network of corresponding silicon oxides. Generally, gel formation is achieved at temperatures of between about 20° and 80° C., preferably at room temperature.

Prior to this step, the glass forming mixture containing the network of corresponding silicon oxides can optionally be processed using conventional methods to produce the desired final form or shape. For example, by holding the network-containing sol in a mold for sufficient time, a gel (and, ultimately, a glass material) having the shape of the mold can be formed. Other free standing forms of the glass material can be obtained by, for example, spin-casting, dye-casting, film-casting, sputtering, extrusion, aerosol spraying, particle precipitation, and fiber pulling.

In cases where the glass material is to be a film bonded to a substrate, the glass forming mixture or the glass forming mixture containing the silicon oxide network is contacted with the substrate's surface, such as by casting the glass forming mixture onto the substrate's surface using conventional techniques. Where the substrate is a fused glass substrate, it is frequently advantageous first to treat the fused glass substrate under conditions effective to produce silanol groups on the substrate surface. This treatment may be effected by any of the known techniques for producing surface silanol groups on fused glass surfaces, such as by exposing the fused glass surface to a strong base (e.g. 1M potassium or sodium hydroxide) for about 15 minutes to about 12 hours. Other common methods for producing surface silanol groups include acid etching with, for example, hydrofluoric acid.

Depending on the processing method employed to achieve the desired form of the glass material, it can be advantageous to increase or decrease the rates of hydrolysis and gelation. Rapid hydrolysis and longer gelation times are effected by addition of an acid catalyst (e.g., hydrogen chloride, nitric acid, or acetic acid) while faster condensation rates and shorter gelation times are accomplished with a base catalyst (e.g., $NH_4OH$).

Subsequent to gelation but prior to drying, the gel can optionally be aged at a temperature of about 20° C. to about 100° C. and for a time period of 1 hour to several weeks.

Once a gel is formed and optionally aged, it must be dried. The pore size of silicate gel can be increased by the use of N,N-dimethylformamide in combination with small amounts of ammonia. When HCl is used as a catalyst, similar results are achieved by adding ethylene glycol to the glass forming mixture.

By drying under hypercritical conditions (i.e., above the critical temperature and pressure of the liquid within the gel), a dried gel known as an aerogel is formed. Under such conditions, a liquid-vapor interface does not exist, and the supercritical fluid within the gel pores can be vented without developing capillary forces that can weaken the aerogel. For alcohol-water mixtures usually found in the gel, hypercritical drying is at a temperature of 290°–310° C., preferably 300° C., and at a pressure of 136–184 atmospheres, preferably 163 atmospheres. Under these conditions, 12–18 hours are generally required to dry the gel to a porous aerogel with substantially no interstitial liquid. The temperatures required for hypercritical drying of alcohol-water containing gels can degrade the alkyl substituents bonded to interior silicon atoms, surface silicon atoms, or both. Consequently, it is preferred to produce aerogels by first displacing the liquid resident in the gel after gelation with a hypercritical drying solvent, such as by immersing the gel in the hypercritical drying solvent for a period of time ranging from about 10 minutes to about 10 weeks, depending on the porosity of the gel. The gel is then dried under hypercritical conditions suitable for the hypercritical drying solvent employed. Suitable hypercritical drying solvents include, methanol, ethanol, and, preferably, carbon dioxide, as well as those listed in Saito, et al., eds., *Fractionation by Packed-Column SFC and SFE,* New York:VCH Publishers (1994) ("Saito"), which is hereby incorporated by reference. Appropriate hypercritical drying conditions for these solvents depend on their critical temperatures and pressures, which, respectively, are 240° C. and 7.93 MPa for methanol, 243° C. and 6.36 MPa for ethanol, and 31.1° C. and 7.36 for carbon dioxide. Critical temperatures and pressures for other hypercritical solvents are disclosed in Saito, which is hereby incorporated by reference. Glass materials, thus produced, typically have a porosity of at least 80% and a density of about 0.2 grams per cubic centimeter and permit flow of chromatographic solvents therethrough. Consequently, in OTLC, OTEC, and other chromatographic applications, this glass material provides a stationary phase which includes alkyl groups protruding into the pores of the aerogel as well as those on the surface of the material. This gives rise to a much higher phase ratio than glass materials which consist of non-porous particles where the eluent/stationary phase interaction is limited to the surface area of the particles.

Xerogels are prepared by drying the gel at or near atmospheric pressure, optionally under a flow of an inert gas, such as nitrogen or argon. In one method, the drying is carried out by permitting the solvent to evaporate slowly at substantially room temperature. In an alternative method, the gel is dried by heating the network of corresponding one or more silicon oxides at a temperature from about 30° C. to about 200° C. and at substantially atmospheric pressure. In cases where the capacity factor of a particular solute interacting with the silica material is important, such as where the silica material is to be used in chromatograpy, capacity factors can be increased by drying the gel at higher temperatures, up to about 120° C. Drying the gel at temperatures greater than about 120° C. results in a reverse of this trend (i.e. capacity factors decrease as drying temperature is increased).

Alkylalkoxysilanes for use in the methods of the present invention may be prepared by reacting alkylhalosilanes and alcohols as follows:

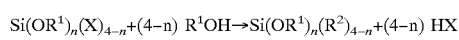

where $R^1$ and $R^2$ are as defined above, where X is a halide, preferably a chloride, and where n is 2 or 3.

Similarly, where employed, tetraalkoxysilanes can be prepared by reacting tetrahalosilanes as follows:

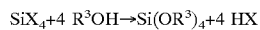

where $R^3$ is H or an unsubstituted alkyl, preferably an unsubstituted linear lower alkyl, such as methyl or ethyl, and where X is a halide, preferably a chloride.

Aside from alkoxides of silicon, this procedure can be utilized additionally to form alkoxides of other metals, such as aluminum, zirconium, and titanium. These metal alkoxides may be used in a mixture with the alkylalkoxysilanes and optional tetraalkoxysilanes when it is sought to form a product containing these metals.

The methods of the present invention are particularly suitable for producing a composite glass capillary tube. A glass forming mixture, such as the one described above, is formed and contacted with the inner surface of a fused glass capillary tube. The contacting can be effected by any suitable means, but injecting the glass forming mixture into the capillary tube is particularly convenient. The glass forming mixture is held in contact with the inner surface of the glass capillary tube for a period of time effective to react a portion of the glass forming mixture with the inner surface of the glass capillary tube to form a coated capillary tube. The one or more alkylalkoxysilanes and optional tetraalkoxysilanes and alkoxides of other metals in the glass forming mixture are then converted to a network of corresponding one or more silicon oxides, and a gel is then formed from the glass forming mixture containing the network of silicon oxides. The gel is then dried to form a porous glass coating on the capillary tube's inner surface, and the porous glass coating can optionally be densified, depending on the use to which the capillary is to be put.

Optionally, at some point after contacting the glass forming mixture with the capillary's inner surface and before or during converting the alkylalkoxysilanes, optional tetraalkoxysilanes, and optional metal alkoxides to a network of silicon oxides, a portion of the glass forming mixture can be removed from the capillary tube to reestablish a throughbore having a diameter equal to the diameter of the uncoated capillary tube less twice the thickness of the coating. Removal can be carried out most effectively by applying pressure, preferably with a stream of gas, such as nitrogen or argon, thus forcing out unreacted glass forming mixture and leaving a thin film on the inner surface of the capillary. The thickness of the coating is a function of a number of factors, including, primarily, the time the glass forming mixture is left in the capillary tube prior to reestablishing the throughbore, the temperature, the rate of network formation and gelation (which, as described above, can be contolled by addition of acid or base catalysts), and the pressure and duration of the gas flow used to remove the glass forming mixture. After converting the alkylalkoxysilanes to a network of silicon oxides and after forming a gel from the network, drying is preferably carried out so that a xerogel is formed.

Where no portion of the glass forming mixture is removed prior to gelation, no throughbore is reestablished, and, upon gelation, the capillary is substantially filled with a gel. In this case, it is preferred that the drying process be carried out under conditions effective to form an aerogel and that the aerogel not be densified. Under these conditions, the pores of the gel remain interconnected, thus permitting liquid to pass through the capillary via the interconnected pores.

Although the materials of the present invention have been discussed mainly with reference to their use in chromatographic applications, their utility is not limited to these applications. Rather, the materials are useful in any application where surface modified silica materials, prepared by conventional silanization procedures, are employed. For example, unmodified silica materials, such as glasses, have high surface energies, which tend to cause strong ionic interactions of certain biopolymers, such as proteins, to their surfaces. By reducing the surface energies of these materials, such as by chemically modifying the glass surfaces with silanizing agents to introduce surface alkyl groups, the above interactions can be decreased. In view of this principle, the methods of the present invention can be used to coat the unmodified silica materials to produce a surface containing alkyl moieties having reduced surface energies and reduced ionic interactions. These methods can be used to protect any glass which is commonly in contact with biopolymers, such as pipets, laboratory glassware, and electrodes.

The present invention is further illustrated by the following examples.

EXAMPLES

Example 1—Instrumentation, Chromatographic Conditions, and Chemicals

All OTLC experiments were performed in the following system. The mobile phase was delivered by a syringe pump (Model 100DM, Isco, Lincoln, Nebr.). Samples were injected with a 60 nL loop Valco injection valve. The capillary column was situated at the exit of the injector, where the injected sample and the eluent were split to deliver appropriate amounts through the capillary column. On-column detection was carried out by using a UV detector (Model $CV^4$, Isco) at 220 nm. The signal from the UV detector was fed into an analog-to-digital converter board (DT2804, Data Translation, Marlboro, Mass.) mounted on an IBM PC. Data acquisition was controlled by means of GRAMS 386 for Chromatography software (Galactic Industries Corp., Salem, N.H.).

OTEC experiments were performed in a system constructed for capillary electrophoresis ("CE"). The electrical field was supplied with a Glassman (Whitehouse Station, N.J.) high-voltage power supply (0–30 kV). The high voltage supply was housed in a plexiglass box for the operator's safety. On-column detection was made with the UV detector described above. Samples were introduced into the column by electrokinetic injection. The electroosmotic mobility in OTEC was measured by injecting a sample solution containing a small amount of ethanol, which served as the unretained neutral marker. Electrochromatography was performed isocratically and without pressurization.

Tetraethoxysilane ("TEOS"), n-octyltriethoxysilane ("$C_8$-TEOS"), and n-octyldimethylchlorosilane were purchased from United Chemical Technologies (Horsham, Pa.). Polycyclic aromatic hydrocarbons ("PAHs"), used as test compounds, were obtained from Aldrich (Milwaukee, Wis.). Water was purified with an ULTRA-PURE™ water purification system (Millipore, Bedford, Mass.). Stock solutions of the test compounds were prepared in HPLC grade methanol or ethanol (Fisher, Pittsburgh, Pa.) and diluted with the mobile phase prior to injection. The desired mobile phase was prepared by mixing appropriate amounts of methanol and water, for OTLC, and methanol and a sodium phosphate solution (~1 mM, pH ~7), for OTEC. The mobile phase was filtered through 0.45 $\mu$m nylon membrane filters (Supelco, Bellefonte, Pa.) and degassed prior to use. Fused silica capillaries (13 $\mu$m i.d., 350 $\mu$m o.d.) were obtained from Polymicro Technologies (Phoenix, Ariz.).

Example 2—Column Preparation

Preparation of a capillary column with the stationary phase involved the following: (1) pretreatment of the bare fused silica capillary, (2) preparation of the sol-gel solution, and (3) coating of the pretreated capillary. To expose the maximum number of silanol groups on the silica surface, the fused silica capillaries were first treated with 1M KOH solution for 1 hour and then washed with water for another hour. The columns were then dried in an oven at ~180° C. under nitrogen flow overnight. The sol-gel solution was prepared by mixing appropriate amounts of TEOS, $C_8$-TEOS, ethanol, and water. The water to silane (including both $C_8$-TEOS and TEOS) ratio was maintained at 3.5:1. For example, to obtain a $C_8$-TEOS/TEOS ratio of 0.2, the following amounts were used: 0.14 mL of $C_8$-TEOS, 0.50 mL of TEOS, 0.18 mL of water, 0.30 mL of ethanol, and about 6 $\mu$L of 0.1M HCl. To obtain a $C_8$-TEOS/TEOS ratio of 0.3, the following amounts were used: 0.21 mL of $C_8$-TEOS, 0.50 mL of TEOS, 0.19 mL of water, 0.33 mL of ethanol, and about 6 $\mu$L of 0.1M HCl. HCl was added as the catalyst until the apparent pH of the solution was ~5, indicated by a short-range pH test paper (Fisher Scientific). After stirring the solution for 6 hours at room temperature, the liquid-like sol-gel solution was introduced into the pretreated capillary by a syringe. The sol-gel solution was allowed to stay inside the capillary for several minutes (~5 min) and then was forced out of the capillary using pressurized nitrogen (~400 psi), leaving a thin film on the inner wall of the capillary. The coated column was then dried overnight in an oven at a temperature of 120° C., under nitrogen flow. The prepared column was washed with acetone and methanol and then equilibrated with the mobile phase before use.

The coating thickness was obtained by measuring the inner diameter of the capillary column before and after coating. The migration time of an unretained species at a given inlet pressure was obtained in different methanol-water mixtures at 25° C. using a P/ACE 2200 capillary electrophoresis system (Beckman, Fullerton, Calif.). The inner diameter of the capillary was then calculated using tabulated data for the viscosity of the water-methanol mixtures at 25° C., such as those found in West, ed., *CRC*

*Handbook of Chemistry and Physics,* Boca Raton, Fla.:CRC Press, p. D238 (1989), which is hereby incorporated by reference, and the Hagen-Pouseuille equation.

A capillary column with a chemically bonded stationary phase, attached by conventional procedures, was prepared by filling the pretreated capillary with n-octyldimethylchlorosilane or octyltriethoxysilane, capping both ends of the capillary with septa, and heating the capillary in the oven at 70° C. overnight. Excess silane reagent was forced out of the column, and the column was washed with acetone and methanol for 2 hours prior to equilibration with the mobile phase.

Example 3—Effect of Column Preparation Conditions

TEOS, a commonly used precursor for a glass matrix, was hydrolyzed in conjunction with a second monomeric unit that contaied an alkyl substituent, $C_8$-TEOS. The $C_8$-TEOS coprecursor imparts an organic character to the silica glass and the organic $C_8$ moiety acts as the stationary phase for reverse phase OTLC and OTEC. The amount of water added corresponded to the stoichiometric quantity required to hydrolyze completely TEOS and $C_8$-TEOS.

As indicated above, the material was introduced into the capillary during its liquid-like stage after 6 h of stirring at room temperature. This stirring time was necessary to achieve reproducible retention behavior. As shown in FIG. 1, retention increased with reaction time, indicated by the increase in the capacity factors; however, only a small change in capacity factor was observed after 6 hours of reaction. It is believed that hydrolysis was complete after about 6 hours of stirring, after which time the sol-gel material was mainly undergoing polycondensation reactions (Hench et al., *Chem. Rev.,* 90:33 (1990) ("Hench") and Coltrain et al., In *The Colloid Chemistry of Silica,* Bergna, ed., Washington D.C.:American Chemical Society, Chapter 19 (1994), which are hereby incorporated by reference) involving the hydrolyzed TEOS and $C_8$-TEOS precursors.

Figure 2:
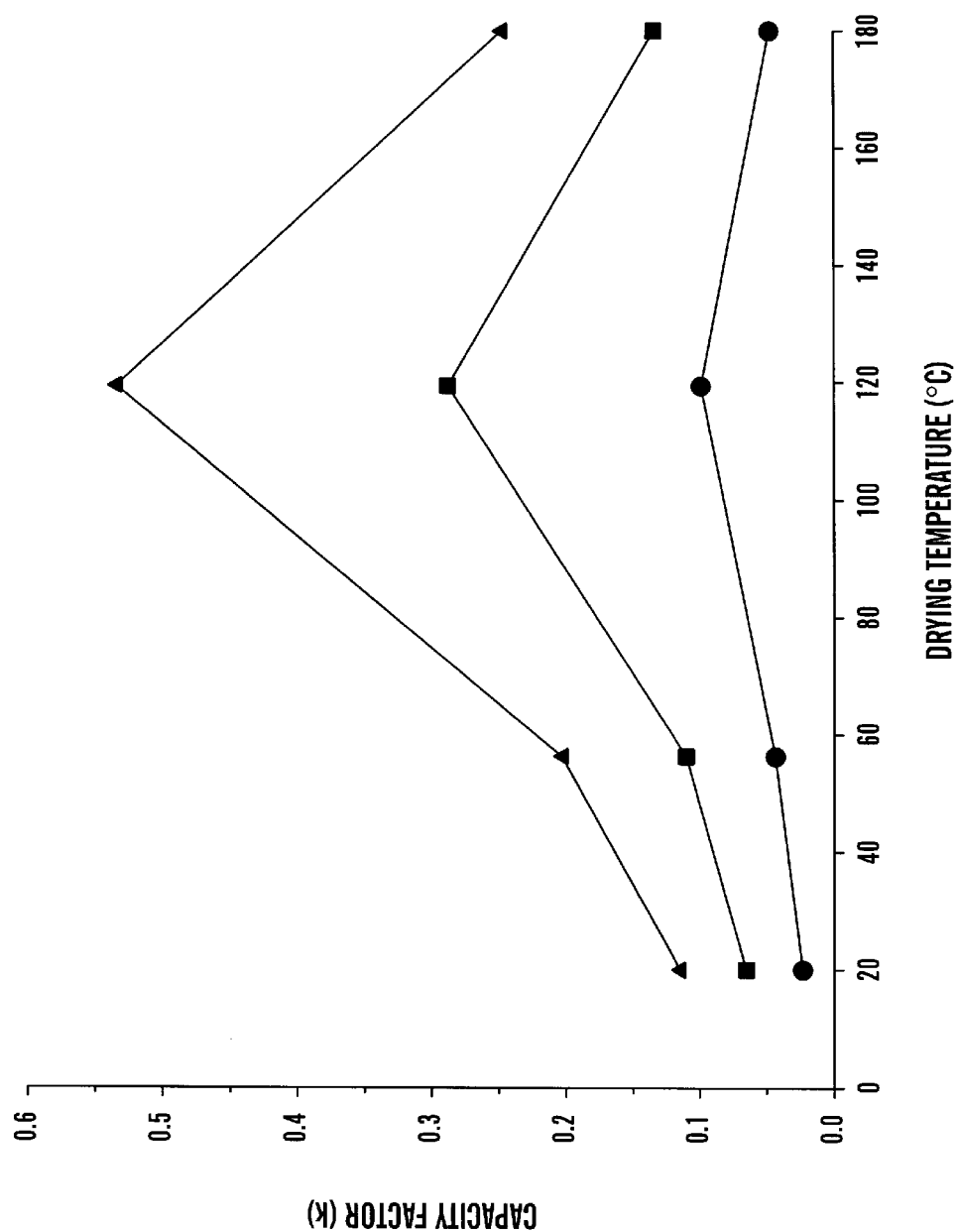
FIG. 2 is a graph showing the effect of drying temperature on capacity factors of three polycyclic aromatic hydrocarbon ("PAH") test compounds: naphthalene (●), phenanthrene (■), and pyrene (▼). The original sol-gel solution contained 17.1% $C_8$-TEOS. Separation conditions were as follows: fused silica capillary, 10 μm i.d.×36 cm long (injection to detection); mobile phase, methanol/1 mM phosphate (70:30); separation voltage, 30 kV; electrokinetic injection, 2 s at 18 kV; detection, UV at 220 nm.

Drying temperature also played a very important role in determining the surface properties (such as pore size and surface area) of the sol gel coating. FIG. 2 shows the effect of drying temperature on capacity factors of three PAH test compounds in a $C_8$-TEOS/TEOS coated capillary column. Capacity factors increased as the drying temperature was increased from room temperature (~20° C.) to 120° C. However, further increase of the drying temperature resulted in a ~50% decrease in capacity factors.

The observed increase in capacity factor is possibly due to the accelerated condensation reactions of the sol-gel material at higher temperature. Since, in the processes described in these examples, the hydrolysis of the precursor is carried out outside the capillary before coating, the wet sol-gel film on the capillary wall mainly undergoes further polycondensation during its aging and drying stages. At higher temperatures (such as ~180° C.), pore collapse can occur with the removal of the solvent, which can result in a decrease in the surface area of the sol-gel coating (Brinker et al., *Sol-Gel Science,* New York:Academic Press (1990) ("Brinker"), which is hereby incorporated by reference).

Example 4—Column Performance

It is believed that the silanol groups at the surface of the silica capillary are incorporated into the polycondensation reactions, anchoring the coating material to the capillary walls. Since the octyl ($C_8$) groups of the organosilane precursor do not participate in the condensation reactions, they are exposed to serve as the stationary phase in the separation process. This can be seen in FIGS. 3A and 3B, where the separation of three model compounds is shown for two columns, one coated with the $C_8$-TEOS/TEOS material (FIG. 3A) and the other coated with TEOS only (FIG. 3B). The three test compounds were baseline separated in the $C_8$-TEOS/TEOS column. In contrast, no separation was achieved in a capillary column coated with a silica glass layer prepared with only TEOS. This indicates, chromatographically, that $C_8$ groups were exposed at the coating surface and served as the stationary phase for the separation.

Figures 4A, 4B:
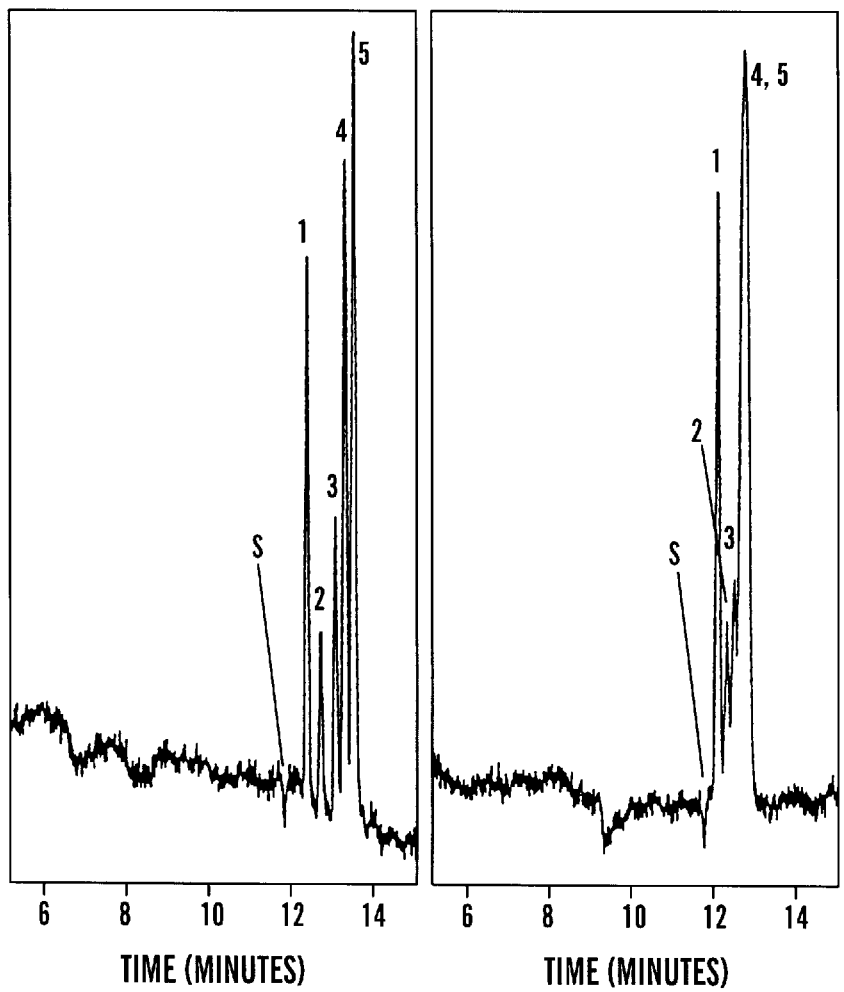
FIGS. 4A and 4B are chromatograms of test mixtures containing five PAH compounds ((1) naphthalene, (2) biphenyl, (3) fluorene (4) 2-ethylnaphthalene, and (5) 2,6-dimethylnaphthalene) separated by OTLC. The stationary phases were prepared by the sol-gel method with a $C_8$-TEOS/TEOS ratio of 0.5 (FIG. 4A) or by attaching octyltriethoxysilane to the capillary walls by conventional methods (FIG. 4B). Separation conditions were as follows: capillary column, 10 μm i.d.×50 cm long (injector to detector); mobile phase, methanol/water (70:30); flow rate, 3.3 nL/min; injection volume, 5 pL; detection, UV at 220 nm. Solvent front is identified with S.
Figures 5A, 5B:
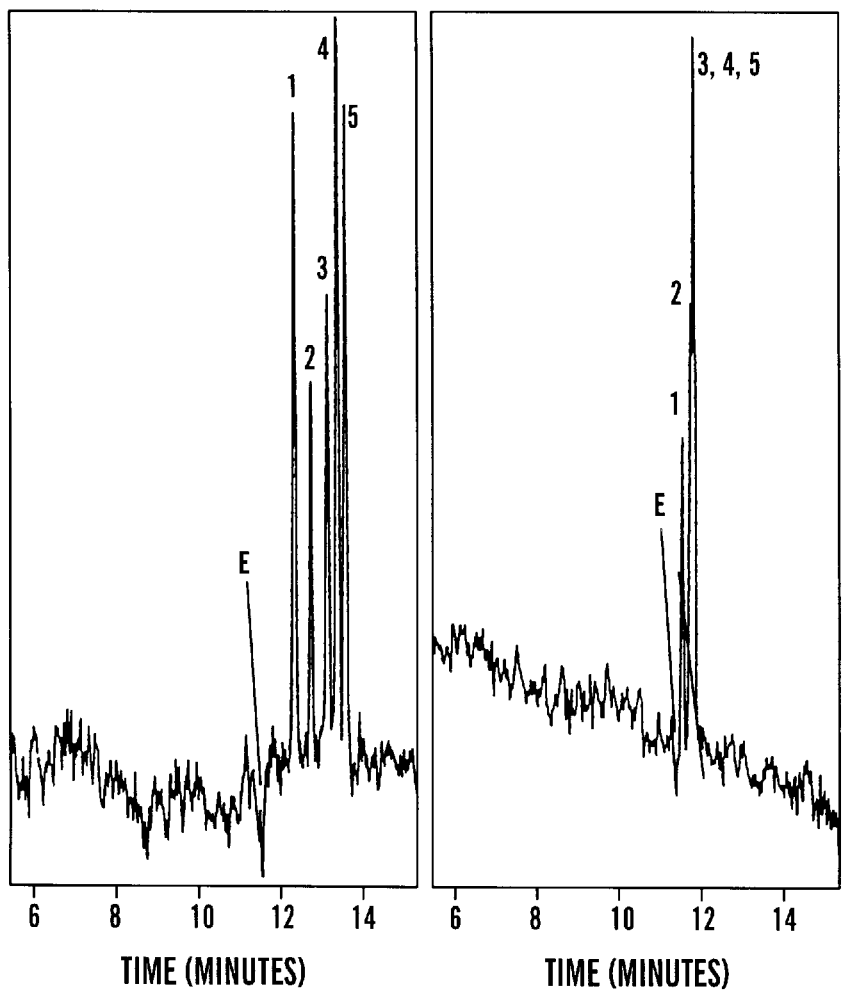
FIGS. 5A and 5B are electrochromatograms of test mixtures containing five PAH compounds: (1) naphthalene, (2) biphenyl, (3) fluorene (4) 2-ethylnaphthalene, and (5) 2,6-dimethylnaphthalene. Stationary phases were prepared by the sol-gel method ($C_8$-TEOS/TEOS ratio of 0.4) (FIG. 5A) and the conventional procedure using n-octyldimethylchlorosilane (FIG. 5B). Separation conditions were as follows: capillary columns, 13 μm i.d.×50 cm long (injection to detection); mobile phase, methanol/1 mM phosphate (75:25 for FIG. 5A and 60:40 for FIG. 5B); separation voltage, 30 kV; electrokinetic injection, 2 s at 21 kV. Electroosmotic mobility is indicated with an E.

A group of PAH compounds were also used to test capillary columns coated with the sol-gel material. The capillaries were used for OTLC and OTEC and compared with capillary columns containing a $C_8$ stationary phase that were prepared by reacting n-octyldimethylchloro-silane or n-octyltriethoxysilane with the capillary walls (using conventional procedures). FIGS. 4A and 5A depict the separation of five model compounds by OTLC and OTEC in capillary columns with the stationary phase prepared by the sol-gel methods of the present invention ($C_8$-TEOS/TEOS ratio of 0.4 and 0.5 for OTEC and OTLC, respectively). FIGS. 4B and 5B show the separation of these compounds on columns prepared by the conventional silanization procedures. The columns prepared by the sol-gel procedure exhibited superior separation characteristics (see capacity factors, resolution, and plates in figure captions). For example, when using the $C_8$-TEOS/TEOS coated capillaries, efficiencies of 240,000 plates/m for biphenyl in OTLC and 500,000 plates/m for biphenyl in OTEC were observed. In the OTLC experiments, using a $C_8$TEOS/TEOS coated capillaries, the resolution between peaks corresponding to biphenyl and fluorene was 2.3, while it was 1.2 between peaks corresponding to 2-ethylnaphthalene and 2,6-dimethylnaphthalene. Using a column prepared by the conventional method, the resolution between biphenyl and fluorene peaks was 0.7, while it the 2-ethylnaphthalene and 2,6-dimethylnaphthalene peaks were not resolved at all. For OTEC, even when the separation conditions were slightly adjusted to a more favorable retention in the conventionally prepared column (60% instead of 70% organic phase), insufficient retention and poor resolution were still observed. The α values indicate that the sol-gel-derived phase has a different selectivity than the conventionally prepared column. The increase in retention in the capillaries with the sol-gel material is indicative of a larger phase ratio. This is believed to be the result of an increase in surface area, which is characteristic of glasses fabricated by the sol-gel procedure (Hench, Brinker, and Lev et al., *Anal. Chem.,* 66:22A (1995), which are hereby incorporated by reference).

A similar experiment using a coated capillary ($C_8$-TEOS/TEOS ratio of 0.3) also resulted in a baseline resolution of phenol, toluene, naphthalene, and biphenyl.

Example 5—Effect of Varying the $C_8$-TEOS/TEOS Molar Ratio

Figure 6:
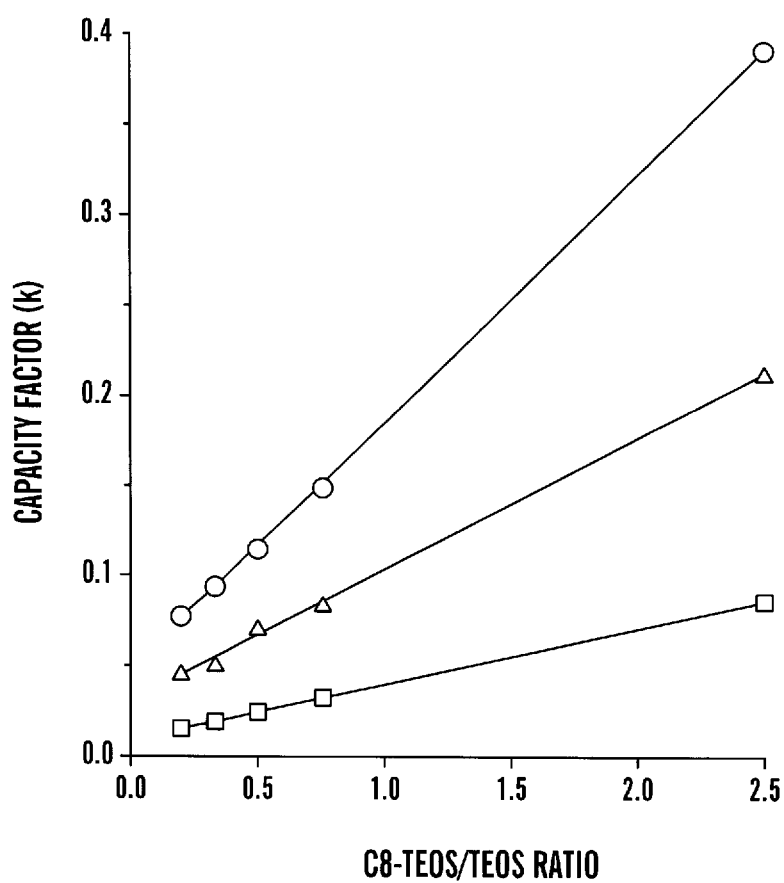
FIG. 6 is a graph of capacity factor ("k") vs the $C_8$-TEOS/TEOS ratio for three test compounds: naphthalene (◇), phenanthrene (Δ, and pyrene (○). Separations were performed by OTEC. Separation conditions were the same as in FIG. 1.

Changing the molar ratio of the two precursors ($C_8$-TEOS and TEOS) in the glass forming mixture changed solute retention in the sol-gel materials. The effect of $C_8$-TEOS/TEOS ratio on the capacity factors of three test compounds is shown in FIG. 6. The k for each $C_8$-TEOS/TEOS ratio was determined at least five times with reproducibilities between 2% and 3% (RSD). Such reproducibility in capacity factors was also attained for at least 30 runs using the same column ($C_8$-TEOS/TEOS=0.3). The capacity factors of all three test compounds increased with increasing $C_8$-TEOS/TEOS ratio in the glass forming mixture. This indicates that raising the $C_8$-TEOS content in the glass forming mixture increased the surface coverage of the stationary phase prepared with the sol-gel method. When the capacity factor increased, the plate height ("H") also increased (under the same separation conditions), as predicted by theory. If the mobile phase is adjusted in such a way that similar k are obtained from two columns containing different $C_8$-TEOS/TEOS ratios, then the efficiencies are similar. For example, the efficiency for naphthalene having a k ~0.06 was ~430,000 theoretical plates/m for a column with either $C_8$-TEOS/TEOS=0.3 or $C_8$-TEOS/TEOS=1.

Example 6—Reproducibility Studies

Five different columns containing a $C_8$-TEOS/TEOS ratio of 0.3 were prepared and evaluated under similar experimental conditions. The capacity factors ("k") and theoretical plates for the test compounds, based on at least three separate runs, are shown in Table 1. The average k for naphthalene and phenanthrene in the columns was 0.049 (RSD=17%) and 0.124 (RSD=16%), respectively. The average plates/m were 334,000 (RSD=12%) for naphthalene and 280,000 (RSD=8%) for phenanthrene. The differences between the columns can be attributed to the capillary coating step. In the procedures used to prepare the columns, the sol-gel solution was flushed through the capillary manually by means of a syringe. Although very simple and convenient, the procedure does not give accurate control of the flow through the capillary. Therefore, this operation can lead to different film thicknesses, which in turn can affect the retention characteristics of the columns. Under more controlled coating conditions, such as by the use of a syringe pump or similar device, more reproducible film thicknesses are expected, and, thus, the variability between columns can be minimized.

TABLE 1

| column no. | naphthalene | | phenanthrene | |
| --- | --- | --- | --- | --- |
| | κ | plates/m | κ | plates/m |
| 1 | 0.054 | 293,000 | 0.144 | 264,000 |
| 2 | 0.036 | 334,000 | 0.091 | 293,000 |
| 3 | 0.046 | 344,000 | 0.129 | 277,000 |
| 4 | 0.058 | 304,000 | 0.135 | 256,000 |
| 5 | 0.049 | 395,000 | 0.122 | 310,000 |

Example 7—Column Stability

The stability of the stationary phase prepared by the sol-gel method under acidic and basic conditions was studied.

The test at low pH involved the washing a capillary column (10 μm i.d. and 37 cm long, injector to detector) with 1% trifluoroacetic acid (pH ~0.3) for a period of time, after which the acid was flushed out of the column. The capillary was filled with a mobile phase consisting of methanol/1 mM phosphate buffer (70:30) and equilibrated for 20 minutes. A sample mixture containing naphthalene and phenanthrene was injected into the column to evaluate its performance. The procedure was repeated several times until the column was exposed to 1% trifluoroacetic acid for a period of 32 h.

Stability at high pH was tested by adjusting the pH of the mobile phase to 11.4 with $Na_3PO_4$ and continuously running the mobile phase through the capillary column (10 μm i.d. and 37 cm long, injector to detector) for a period of 48 h. At certain intervals, the test mixture was injected to evaluate column performance.

FIGS. 7A and 7B show the capacity factor for the probe compounds during both tests, under acidic (FIG. 7A) and basic (FIG. 7B) conditions. The capacity factors remained unchanged throughout the test. This indicates that a retentive layer was on the surface of the capillary to effect separation, even after exposure to high- or low-pH conditions. The hydrolytic stability of the stationary phase can be attributed to the fact that the stationary phase is not prepared by modifying the silica surface through siloxane bonds, as in the conventional procedure. Instead, the stationary phase is obtained through bulk modification of the silica glass prepared through the sol-gel process.

The stability of the stationary phase to high and low pH is attributed to two factors. First, the $C_8$ groups serving as the stationary phase on the sol-gel coating are linked to the silica support through Si—C bonds, which are more hydrolytically stable than the O—Si bonds obtained during surface modification (Cobb et al., *Anal. Chem.*, 62:2478 (1990), which is hereby incorporated by reference). Second, as postulated in Kirkland et al., *J. Chromatogr.*, 691:3 (1995), which is hereby incorporated by reference, at high-pH values, the performance degradation of the stationary phase prepared by conventional means is more a result of hydrolytic dissolution of the silica surface than of siloxane bond cleavage. In capillary columns prepared using the methods of the present invention, the $C_8$-TEOS precursor is incorporated into the sol-gel network, and the modification becomes an intrinsic property of the glass matrix. Therefore, if a layer of the glass material were removed from the surface by hydrolytic processes, the newly exposed layer would also contain silicon atoms bonded to $C_8$ moieties and, consequently, would also exhibit the surface characteristics of the glass material. This is believed to account for the observed performance at high-pH conditions.

Example 8—Mass Loadability

Figure 8:
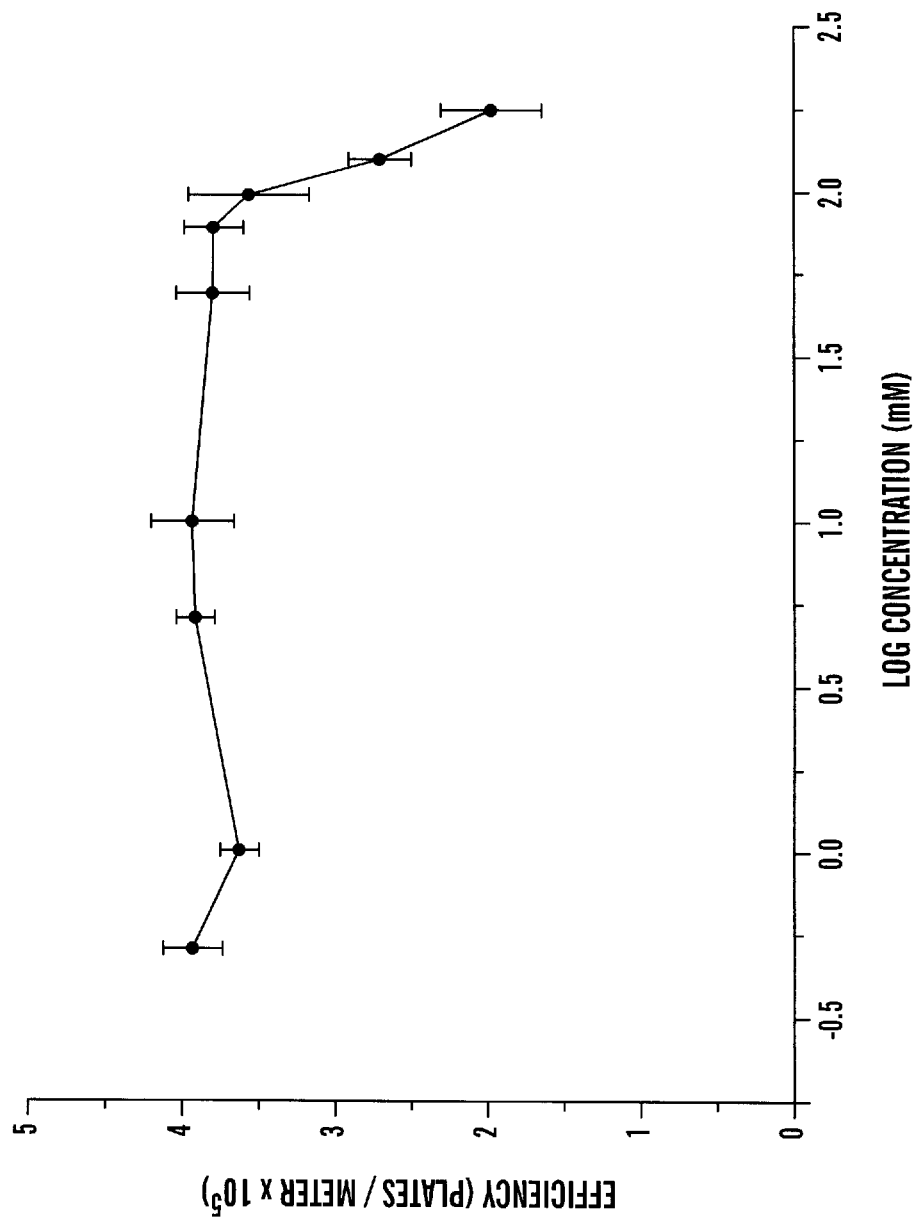
FIG. 8 is a graph showing the effect of sample concentration on efficiency for a column prepared with the sol-gel-derived material ($C_8$-TEOS/TEOS=1). Separation conditions were as follows: capillary column, 10 μm i.d.×50 cm long (injector to detector); mobile phase, methanol/1 mM phosphate (70:30); injection volume, ~15 pL; detection, UV at 220 nm.

Mass loadability of columns coated with $C_8$-TEOS/TEOS (molar ratio=1) was assessed by injecting different concentrations of naphthalene into the columns operated in the OTEC mode. The results are presented in FIG. 8. It can be seen that the efficiency started to degrade at a concentration of 100 mM, indicating overloading. In conventional columns, efficiency deteriorated at concentrations below 10 mM. Since the columns prepared by the methods of the present invention can be operated at concentrations in the 20 mM to 100 mM range, the sensitivity of the detection system need not be as great as that required for conventional columns. Consequently, on-column UV detection can be used even in very narrow tubes, where the path length for detection (equal to the inner diameter of the capillary column) is on the order of ~10 μm.

Example 9—Electroosmotic Mobility in Coated Capillaries

Measurement of electroosmotic mobility is important for predicting the accessible linear velocity in electrochromatography. Factors controlling the electroosmotic flow ("EOF"), such as field strength, pH and ionic strength of the mobile phase, and organic modifiers have been described in Kitagawa et al., *J. Microcol. Sep.*, 6:91 (1994) and Pfeffer et al. *J. Chromatogr.*, 557:125 (1991), which are hereby incorporated by reference.

Figure 9:
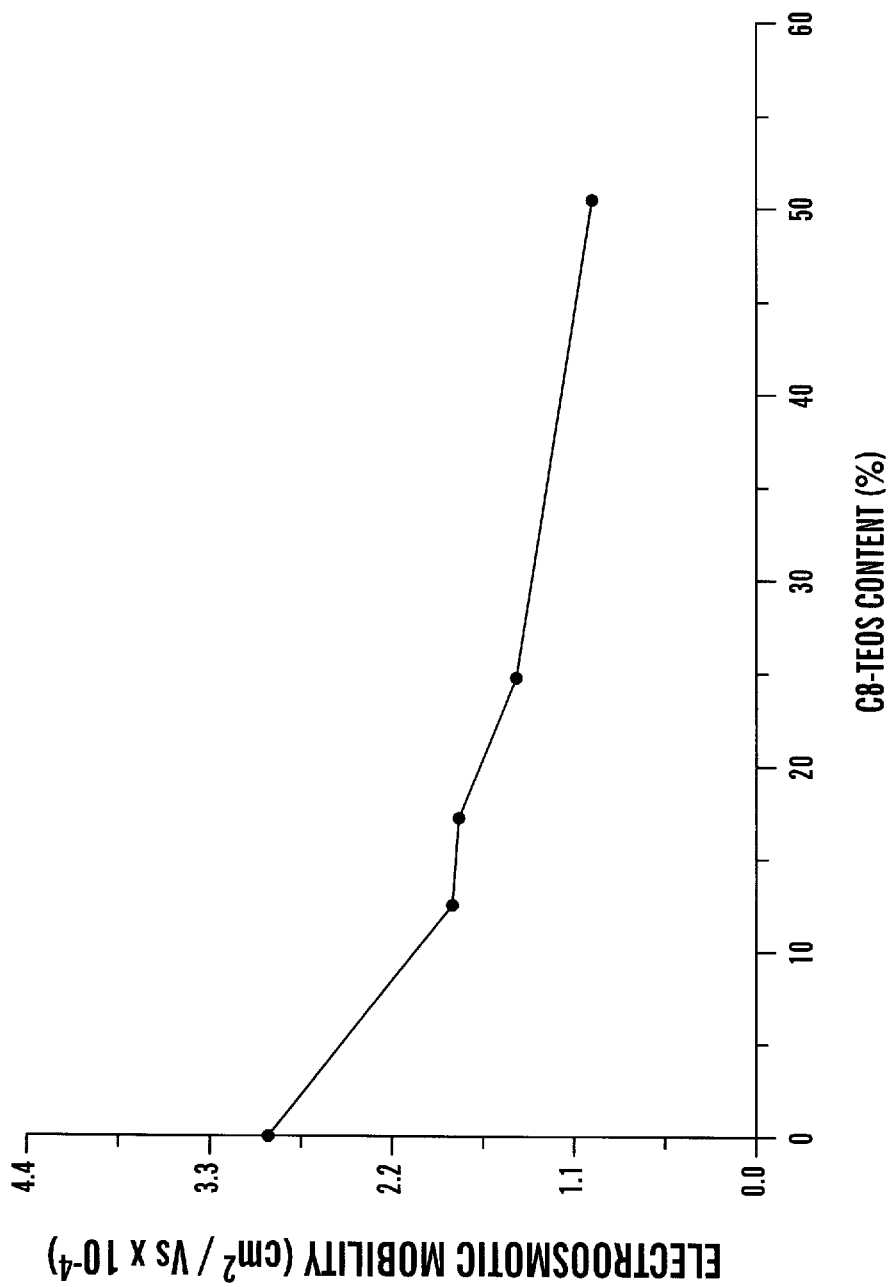
FIG. 9 is a graph showing the electroosmotic mobility in capillary columns coated with $C_8$-TEOS/TEOS sol-gel material containing varying amounts of $C_8$-TEOS in the glass forming mixture. The measurements were performed using a methanol/1 mM phosphate (67:33) mobile phase.

Electroosmotic mobility in capillary columns coated with the $C_8$TEOS/TEOS material was measured by using a small amount of ethanol in the samples as a neutral marker. The electroosmotic mobility measured in coated capillaries using phosphate buffers of different pH values (pH 4–9) showed a trend similar to that observed in bare fused silica capillaries and similar to that observed in capillaries coated only with TEOS. As FIG. 9 shows, electroosmotic mobility in the coated capillary columns is affected by the $C_8$-TEOS/TEOS molar ratio used in the glass forming mixture. Electroosmotic mobility decreased as the $C_8$-TEOS percentage (v/v) in the sol-gel solution was increased. This is believed to be due to a decrease in the number of silanol groups at the surface of the sol-gel coating bonded to $C_8$ moieties. In addition, it was observed that the electroosmotic mobility in a bare fused silica capillary was slightly lower (2.7 $cm^2V^{-1}s^{-1}$) than in a column coated only with TEOS (2.9 $cm^2V^{-1}s^{-1}$). This indicates that the average surface charge of a capillary is increased (Kohr et al., *J. Chromatogr.*, 652:309 (1993), which is hereby incorporated by reference) by the sol-gel process.

Although the invention has been described in detail for the purpose of illustration, it is understood that such detail is solely for that purpose, and variations can be made therein by those skilled in the art without departing from the spirit and scope of the invention which is defined by the following claims.

What is claimed:

1. A continuous mass of silica material having surfaces defining an interior, said interior comprising interior silicon atoms, wherein at least a portion of the interior silicon atoms is bonded to a substituted or unsubstituted alkyl moiety having from 6 to 32 carbon atoms.

2. A continuous mass of silica material according to claim 1, wherein about 1% to 100% of the interior silicon atoms are bonded to the alkyl moiety.

3. A continuous mass of silica material according to claim 1, wherein said surfaces comprise surface silicon atoms with at least a portion of the surface silicon atoms being bonded to the alkyl moiety.

4. A continuous mass of silica material according to claim 3, wherein about 1% to about 100% of the surface silicon atoms are bonded to the alkyl moiety.

5. A continuous mass of silica material according to claim 3, wherein the alkyl moiety is a substituted alkyl moiety.

6. A continuous mass of silica material according to claim 5, wherein the alkyl moiety contains one or more functional groups selected from the group consisting of an alcohol, an amine, a carboxylic acid, a thiol, an ester, and an amide.

7. A continuous mass of silica material according to claim 1, wherein the alkyl moiety is an unsubstituted alkyl moiety.

8. A continuous mass of silica material according to claim 7, wherein the alkyl moiety has the formula:

$(CH_2)_mCH_3$ wherein m is from 5 to 31.

9. A continuous mass of silica material according to claim 8, wherein m is 7.

10. A continuous mass of silica material according to claim 1, wherein the continuous mass of silica material is a particle having a diameter from about 0.3 μm to about 500 μm.

11. A continuous mass of silica material according to claim 1, wherein the continuous mass of silica material is a film bonded to a substrate.

12. A continuous mass of silica material according to claim 11, wherein the substrate is glass having surface siloxy groups.

13. A continuous mass of silica material according to claim 11, wherein the substrate is a glass capillary tube's inner surface.

14. A continuous mass of silica material according to claim 11, wherein the film has a thickness of from about 1 nm to about 100 mm.

15. A continuous mass of silica material according to claim 1, wherein said continuous mass of silica material is an aerogel.

16. A continuous mass of silica material according to claim 15, wherein the continuous mass of silica material substantially fills a glass capillary tube and is bonded to the glass capillary tube's inner surface.

17. A glass particle having a diameter of from about 0.3 μm to about 500 μm and having a surface defining an interior, said interior comprising interior silicon atoms, wherein at least a portion of the interior silicon atoms is bonded to a substituted or unsubstituted alkyl moiety.

18. A glass particle according to claim 17, wherein the substituted or unsubstituted alkyl moiety contains from 6 to 32 carbon atoms.

19. A glass particle according to claim 17, wherein the surface comprises surface silicon atoms with at least a portion of the surface silicon atoms being bonded to the alkyl moiety.

20. A glass particle according to claim 17, wherein the alkyl moiety is unsubstituted and has the formula:

$(CH_2)_mCH_3$ wherein m is from 5 to 31.

21. A glass particle according to claim 20, wherein m is 7.

22. A composite glass article comprising:

a glass tube having an inner wall defining an inner cylindrical space and one or more continuous masses of silica material according to claim 1 covalently bonded to the inner wall of said glass tube.

23. A composite glass article according to claim 22, wherein the surfaces of the one or more continuous masses of silica material comprise surface silicon atoms, at least a portion of which is bonded to the alkyl moiety.

24. A composite glass article according to claim 22, wherein the alkyl moiety is unsubstituted and has the formula:

$(CH_2)_mCH_3$ wherein m is from 5 to 31.

25. A composite glass article according to claim 24, wherein m is 7.

26. A composite glass article according to claim 22, wherein the one or more continuous masses of silica material are aerogels which substantially fill the inner cylindrical space.

* * * * *